3,459,819
8-CHLORO-1-OCTENE
Shigeto Suzuki, San Francisco, Calif., assignor to Chevron Research Corporation, a corporation of Delaware
No Drawing. Continuation of application Ser. No. 336,386, Jan. 8, 1964. This application Sept. 26, 1966, Ser. No. 582,160
Int. Cl. C07c *21/04*
U.S. Cl. 260—654                5 Claims

ABSTRACT OF THE DISCLOSURE

This invention relates to the composition 8-chloro-1-octene and to a method for its production from the catalyzed reaction of 8-bromo-1-octene with lithium or a lower alkyl quaternary ammonium chloride.

---

This application is a continuation of Ser. No. 336,386, filed Jan. 8, 1964.

The present invention is directed to the new compound 8-chloro-1-octene and to a novel method for its production.

8-chloro-1-octene is a colorless liquid at ordinary temperatures and is soluble in most common organic solvents, such as ether, benzene, alkanes and the like, and is essentially insoluble in water.

The novel compound of the present invention is particularly useful as an additive comonomer with lower alkenes in the Ziegler-type production of high molecular weight solid hydrocarbon polymers, such as polyethylene, polypropylene, poly-4-methyl-1-pentene and the like. Relatively small amounts of this compound may be incorporated into these polymers yielding high polymers, substantially, in terms of physical characteristics, unchanged from the conventional polymer, but advantageously, the chloride functionality introduced into such hydrocarbon polymers by the use of the novel compound makes them susceptible to dyeing, vulcanization and the like.

8-chloro-1-octene is not directly available by a conversion of any easily available hydrocarbon, such as 1,7-octadiene, but it has now been found possible to prepare this chloro compound by a bimolecular nucleophilic displacement of the bromide group from 8-bromo-1-octene, provided a satisfactory solvolytic medium is employed.

For various reasons, including superior heat stability at higher temperatures and the like, 8-chloro-1-octene is preferable over 8-bromo-1-octene as a comonomer for uses in hydrocarbon polymers as noted above. There is, however, no known method for the addition of hydrogen chloride to an α-olefin, such as 1,7-octadiene, to directly produce 8-chloro-1-octene. On the other hand, while hydrogen bromide adds under known specific free radical reaction conditions to 1,7-octadiene to yield 8-bromo-1-octene, it is well known that terminal olefins are easily isomerized, both catalytically and thermally under relatively mild conditions to the more thermodynamically stable internal olefins. For this reason, the conversion of 8-bromo-1-octene to 8-chloro-1-octene by a displacement reaction without attendant isomerization of the terminal double bond is difficult to accomplish, but highly desirable in view of the necessity that the olefinic functionality i nthe compound be of the terminal variety in order that the compound be of use.

It has now been found that 8-bromo-1-octene can be converted to 8-chloro-1-octene by heating the bromo compound in the presence of a lower quaternary ammonium chloride or lithium chloride and a miscible, aqueous alkanolic medium at a temperature in the range from about 25–125° C. for a period sufficient to substantially accomplish the conversion, i.e., from at least 10 up to 100%.

By lower quaternary ammonium chloride is meant compounds of the general formula:

$$R_4N^{(+)}Cl^{(-)}$$

wherein the radicals R alkyl groups having from 1 to 10 carbon atoms per group. Tetramethyl ammonium chloride is preferred.

In accordance with the present invention, 8-bromo-1-octene is dissolved in about 95% aqueous ethanol or the equivalent, and this solution together with a stoichiometric excess of tetramethyl ammonium chloride is placed in a reaction zone fitted with a stirrer and reflux condenser. While stirring the mixture vigorously to minimize localized overheating, the mixture is heated at the reflux for about two hours. The initially clear solution soon becomes cloudy and turbid through the formation and precipitation of tetramethyl ammonium bromide. While periodic removal of this solid facilitates a more complete conversion of the 8-bromo-octene to the 8-chloro-octene, such action, while desirable, is not necessary in view of the fact that the chloro- and bromo-octenes are readily separated by distillation. The separated and unconverted 8-bromo-1-octene may be returned to the reaction zone for complete conversion. Upon examination of the 8-chloro-1-octene product, it is found that it tests for only terminal vinyl groups and shows for all practical purposes a complete absence of internal carbon-carbon double bonds.

In general, 60–95% aqueous ethanol is preferred as the solvent medium in the present process, although other water-alkanolic mixtures of about the same relative water-alkanol composition are satisfactory when made up of carbinols having from 1 to 10 carbon atoms per molecule, that is, lower alkanols.

The amount of quaternary ammonium chloride with respect to 8-bromo-1-octene which may be employed in the present process varies. Preferably, a stoichiometric excess, 1.1–5 mols of chloride per mol of bromo-octene, is used. Appreciable amounts of 8-chloro-1-octene are, of course, produced if the relative amount of chloride is less. In general, effective stoichiometric amounts, for example, from about 0.5–5 mols of chloride per mol of the bromo-octene will result in a satisfactory production of 8-chloro-1-octene after reaction periods of from 0.01 to 10 hours, depending upon the temperature employed.

EXAMPLE 1

Into a 500 ml. 3-necked flask equipped with a stirrer, reflux condenser and thermometer were placed 19.1 g. (0.10 mol) of 8-bromo-1-octene, and 55.0 g. (0.50 mol) of tetramethyl ammonium chloride together with 250 ml. of 95% aqueous ethanol. The reaction mixture was heated and brought to the reflux temperature while maintaining a well stirred solution. Initially the solution was clear, but it became turbid after about 30 minutes due to the formation and precipitation of tetramethyl ammonium bromide. After 1.3 hour's reaction time, the exchange reaction was practically complete as shown by a gas chromatographic analysis of an aliquot of the reaction product mixture. Less than 2% of 8-bromo-1-octene remained. Using conventional recovery methods including washing, drying and extractions, the product mixture was distilled under reduced pressure at 100 mm. Hg and found to have a boiling point at this pressure of 92–93° C. A substantially quantitative yield (92%+) of product having $n_D^{25}$ 1.4431 was obtained. From the infrared spectra taken in carbon tetrachloride, the product showed the presence of terminal vinyl groups and the absence of internal double bonds. The following peaks characterized the nuclear magnetic spectrum of 8-chloro-1-octene.

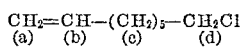

Representative alkanols which may also be employed to constitute aqueous-alkanol media include methanol, propanol, isopropanol, butanol, cyclohexanol, 2-ethylhexanol, octanol and the like.

8-chloro-1-octene was found to be unique as a comonomer in the polymerization of 1-alkenes.

EXAMPLE 2

Into an autoclave were charged the following:

| | | |
|---|---|---|
| n-Heptane | ml | 100 |
| Al(CH$_3$CH$_2$)$_2$Cl | mmols | 3 |
| TiCl$_3$—AA | do | 1 |
| ω-Chloro-α-olefin | do | 12 |
| Propene, pressure | atm | 3.4 | and the temperature of the autoclave and contents was maintained at 50° C. for 2 hours. The yield of polymer recovered was as follows.

| ω-Chloro-α-olefin: | Polymer, g. |
|---|---|
| (a) 3-chloro-1-propene | 0.0 |
| (b) 6-chloro-1-hexene | 0.0 |
| (c) 7-chloro-1-octene | 0.0 |
| (d) 8-chloro-1-octene | 7.0–8.3 |

The foregoing descriptive embodiments of the present invention are illustrative only. It is not the intent that the invention shall be construed as limited to the details of the above description except insofar as such limitations have been included in the terms of the following claims.

I claim:
1. 8-chloro-1-octene.
2. Method of producing 8-chloro-1-octene which comprises contacting 8-bromo-1-octene with an effective stoichiometric amount of a chloride selected from the group consisting of a lower alkyl quaternary ammonium chloride and lithium chloride at a temperature in the range from about 25° to 125° C. in the presence of a miscible, lower alkanolic-water solvolytic medium for a period in the range 0.01–10 hours and recovering the resulting product mixture containing 8-chloro-1-octene.
3. The method of claim 2, wherein said medium is aqueous ethanol containing in the range from about 60–95 volume percent ethanol.
4. The method of claim 2, wherein the reaction is facilitated by continual removal of solid quaternary ammonium bromide.
5. The method of claim 2, wherein lithium chloride is said chloride.

References Cited

Perrine: J. Or. Chem., vol. 18 (1953), pp. 1356–67

LEON ZITVER, Primary Examiner

J. BOSKA, Assistant Examiner

U.S. Cl. X.R.

260—87